US006857365B2

(12) United States Patent
Juffinger et al.

(10) Patent No.: US 6,857,365 B2
(45) Date of Patent: Feb. 22, 2005

(54) METHOD AND DEVICE FOR PRODUCING A PRINTING BLOCK

(75) Inventors: Josef Juffinger, Thiersee (AT); Franz Kurz, Worgl (AT)

(73) Assignee: Schablonentechnik Kufstein Aktiengesellschaft, Kufstein (AT)

( * ) Notice: Subject to any disclaimer, the term of this patent is extended or adjusted under 35 U.S.C. 154(b) by 0 days.

(21) Appl. No.: 10/154,837

(22) Filed: May 28, 2002

(65) Prior Publication Data

US 2002/0195012 A1 Dec. 26, 2002

(30) Foreign Application Priority Data

May 25, 2001 (EP) ........................................... 01112705

(51) Int. Cl.[7] ........................... B41C 1/05; B23K 26/00
(52) U.S. Cl. .............................. 101/401.1; 219/121.76
(58) Field of Search ................................ 101/150, 170, 101/395, 401.1; 219/121.68, 121.61, 121.76, 121.82; 347/237, 239, 247, 255, 262; 430/306

(56) References Cited

U.S. PATENT DOCUMENTS 2,854,336 A * 9/1958 Gutknecht .................. 430/323
4,046,071 A * 9/1977 Mizuno et al. ............. 101/395
4,115,119 A * 9/1978 Okai et al. .................. 430/306
4,213,819 A * 7/1980 Werthmann .................. 216/54
4,600,667 A * 7/1986 Uchida ......................... 430/22
4,610,950 A * 9/1986 Milliken ...................... 430/306
5,427,026 A 6/1995 Kuwahara ................ 101/401.1
6,150,629 A * 11/2000 Sievers .................. 219/121.62
2001/0052924 A1 * 12/2001 Steinke et al. .............. 347/225
2002/0148818 A1 * 10/2002 Satou et al. ........... 219/121.73
2003/0006221 A1 * 1/2003 Hong et al. ............ 219/121.72
2003/0047545 A1 * 3/2003 McKee et al. ......... 219/121.71

FOREIGN PATENT DOCUMENTS

JP 2001-71451 * 3/2001
WO 97/19783 6/1997

* cited by examiner

*Primary Examiner*—Stephen R. Funk
(74) *Attorney, Agent, or Firm*—Birch, Stewart, Kolasch & Birch, LLP

(57) ABSTRACT

To produce a printing block, a relief is introduced into a surface of a printing block blank. To form the relief, material of the printing block blank is removed along tracks by radiation. The relief regions may be formed at different depths along one and the same track by frequent exposure to radiation.

32 Claims, 7 Drawing Sheets

METHOD AND DEVICE FOR PRODUCING A PRINTING BLOCK

BACKGROUND OF THE INVENTION

1. Field of the Invention

The invention relates to a method and a device for the production of a printing block. The printing block may, for example, be a flexible printing block or an inflexible printing block, which can act as a relief printing or gravure printing block.

2. Description of the Relevant Art

To produce a flexographic printing block with the aid of a conventional $CO_2$ laser it is already generally well known for material to be burned out directly from a printing plate, which may be a polymer plate for instance, in order in this manner to produce a relief in the printing plate. In this process, however, the COZ laser is permanently power-modulated so that the process is relatively slow.

Furthermore, for the production of a flexographic printing block PCT/EP96/05277 already discloses the use of two laser beam sources in order with the first laser beam source to obtain fine structures in a desired profile, while by means of the second laser beam source low-level regions in the profile are produced.

Fine and simultaneously low-level regions cannot be produced in this way at relatively high operating speed by the two methods mentioned above without further measures. Power modulation on its own is too sluggish for this purpose, while if an acousto-optical modulator is used the laser power must be limited to relatively low levels in order not to destroy the modulator.

SUMMARY OF THE INVENTION

It is an object of The invention to specify a method for the production of a printing block, in particular a flexographic printing block, with which even very fine and simultaneously deep structures can be rapidly and simply produced. Furthermore, a device suitable for this purpose is to be provided.

In a method according to the invention for producing a printing block, in particular a flexographic printing block, a relief is introduced into the surface of a blank of the printing block in that material of the printing block blank is removed along tracks by radiation, that is by radiation which, for example, is switched on and off by modulators for instance, eg acousto-optical modulators, light deflectors such as movable mirrors, etc, in order by this means to alter the intensity of the radiation. Material is removed in that along one and the same track in each case relief regions located at different depths are produced by correspondingly frequent exposure to radiation. In doing so focused radiation can be used or parallel radiation insofar as it is sufficiently intense or powerful for the said purpose.

Thus, according to the invention it is the case that for forming a relief in the surface of the blank of the printing block relatively flat recesses are obtained by only single exposure of the printing block blank to radiation, while deeper recesses are blocked by multiple exposure to radiation of the corresponding points of the printing block blank. This multiple exposure of the printing block blank to radiation to produce the deeper-level regions occurs with time delays or successively so that a lower-lying region is obtained as it were by repeated scooping out.

Since the lower-lying regions of the relief structure are carved out by repeated exposure to radiation the power of the beam can be relatively low which has the consequence that even very fast modulators, precisely whose beam power when used has to be limited in order to save the modulators from destruction, acousto-optical modulators for instance, can be used for switching the beam power on and off. Thus, according to the invention it is possible to construct even relatively fine and simultaneously deep structures quickly so that printing reliefs of still better quality can be produced. This is also the case in particular with regard to the fact that between each of the individual burn-off operations in the construction of the lower structure regions the printing block material cools again before removal of material starts afresh which has the result that the printing block material does not heat up so markedly at these regions so that the relief can be built up in decidedly exact manner or true to shape. Between the individual burn-off operations the material stripped off can also be taken away, eg sucked off, which allows more precise working in the next removal operation and results in structures of better quality.

According to a refinement of the invention the irradiation of the surface of the printing block blank ensues using one and the same beam which is conveyed repeatedly along a track. In this case only one beam source is necessary which simplifies and hence reduces tie cost of construction and control of the corresponding device. However, in order to construct lower-lying regions a track must then be traversed by the beam several times which prolongs the machining time. This disadvantage, however, could be compensated by providing a plurality of beam sources for producing parallel beams which are each repeatedly guided along one and the same track. The group of parallel beams could then be offset blockwise (in block mode) relative to the printing block blank in order to machine a group of other tracks, etc. In doing so the regions or groups of tracks may also be nested inside one another in order to overcome block boundaries. In this case between tracks of a block there are always tracks of other blocks.

According to a development of the invention irradiation of the surface of the printing block blank is done with a plurality of beams which are successively guided along one and the same track. Thus, one and the same track is treated in succession by different beams. For this purpose the plurality of beams may, for example, may be arranged lying alongside one another in a direction which run transverse to the longitudinal direction of the track. After each pass of the track a relative shift between the printing block blank and group of beams then occurs so that now the same track is machined by a different beam in the group of beams, etc.

In a still further development of the invention the plurality of beams can also be arranged alongside one another in a direction which run in the longitudinal direction of the track. In this case too, one and the same track is now machined successively over time by different beams, the time delay corresponding to the spacing of the beams in the longitudinal direction of the track.

Due to the fact that one and the same track can be treated using different beams it is possible to remove relief regions of different depths by means of beams of different power or by beams of different wavelength for instance. In this way printing blocks of still better quality can be produced. Thus, for example, relief regions located directly on the surface of the printing block blank can be removed by beams whose power is lower and/or whose wavelength is shorter than that of the beams serving to carve out deeper-lying relief regions. In this way the border (print contour) at the surface end of a relief to be constructed can be produced very precisely, which is not absolutely necessary for areas outside the borders since no printing is done here. These areas can, accordingly, be removed at higher power and hence more rapidly in order to accelerate the machining operation.

Advantageously area of material of the printing block blank bounding the relief at the surface end are stripped away first so that in this manner the relief contours can be established while the printing block blank is still at relatively low temperatures. Only after this does further removal of material from the printing block blank ensue to form the lower-lying regions. In this procedure very exact borders are obtained at the surface end of the relief. In principle, however, the reverse procedure is possible, that is to say the borders at the surface end of the relief are blocked last.

According to an advantageous refinement of the invention the regions of material of the printing block blank bounding the relief at the surface end are adapted in spectral sensitivity to the wavelength of the stripping radiation by which means the process for removing these regions of material can be still better controlled in order to obtain reliefs of still greater precision.

In a further development of the invention the exposure of the printing block blank to radiation is done using laser radiation since in this manner the requisite radiation energy can be readily made available. In this respect focused laser radiation may be used.

In order to machine the printing block blank along the tracks the beams or laser beams may be moved relative to the printing block blank or this is done in such a way that the printing block blank is move relative to the fixed beams. Alternatively, the beams and the printing block blank can both be moved relative to one another.

In doing so a printing block blank is used, for example, which has an elastic material forming a printing surface, polymer material, silicone or rubber for instance. However, the printing surface could also be rigid, composed of metal for instance.

Thus, for example a plate-like printing block blank composed of polymer material or other suitable elastic material can be laid onto the surface of a rotatably mounted cylinder and there be fitted firmly in place, for instance by clipping on, by suction by means of vacuum, by magnets, etc. However, to form a printing block blank elastic or polymeric material may also be drawn onto or applied to a rotatably mounted cylinder. For example, these can be flexible tubes which are drawn, onto the cylinder or liquid material or polymer material can be applied by knife coating, spraying and immersion, etc.

According to a very advantageous refinement of the invention the exposure of the printing block blank to radiation along the track in question takes place as a function of data files of which each is assigned to one of the relief regions to be carved out to different depth. Thus, the removal of the regions of material on the printing block blank occurs under purely digital control so that changes in the radiation power may be carried out very rapidly, accelerating the machining process. The data files may also be combined to form an overall file which contains the data files in the form, as it were, of links in a chain which are successively worked through.

In doing so the files are produced according to an advantageous refinement of the invention as follows: construction and electronic storage of a two-dimensional basic relief pattern; construction of one or more borders located at different distances from the basic relief pattern to identify relief regions which should be located at greater depth as the distance from the basic relief pattern increases; drawing a track through the bordered basic relief pattern; searching for boundaries of the basic relief pattern and the relief regions on the basis of the borders on the track; and determining on-and off-commands for the beam with reference to the boundaries found and sorted into data files in each case for the basic relief pattern and he lower-lying relief regions.

If the basic relief pattern is specified, for instance by scanning an original or by graphic layout from a designer on the screen of a computer, then given the track width and course of the track relative to the basic relief pattern the data files for the regions each to be removed to a different depth in the printing block blank can be generated in the printing block blank in very simple manner, by automated means in fact, which likewise accelerates the process workflow.

In doing so, the data files in question may be used for modulating the beams or for switching them on and off. For example, these data files could be used to control acousto-optical modulators by means of which the beams or laser beams are switched on and off and whose mode of operation is generally known.

In order to allow beams of differing intensity to pass through the acousto-optical modulators can be actuated by different control voltages. In that respect different control voltages may be assigned to the respective data files for modulating the beams in order when using one of the data files in question to use one of the control voltages in question to actuate a modulator. The control voltage in question is then switched on in conformity with the data file. This switched control voltage is then applied to the modulator.

A device according o the invention for producing a printing block, in particular a flexographic printing form, contains a mounting for holding a printing block blank, an optical device for irradiating a surface of the printing block blank along a track by means of a least one beam in order by this means to remove material from regions of the printing block blank, and a control device which making use of a data file containing beam-on and beam-off switching commands controls corresponding changes in the intensity of the at least single beam on its way along the track. This device distinguishes itself according to the invention in that the control device is constructed in such a way that it makes available a plurality of data files each containing beam-on and beam-off switching commands (pattern information) of which each is used for machining the printing block blank along the whole track and which are processable in time-delayed manner By means of this time-delayed working through of pattern information or of the data files with regard to one and the same track, radiation can act once or several times along the track in order to obtain correspondingly more flat or more deep regions along the track so that it is possible, due to the rapid controllability of the beam and the fact that the latter can be directed several times in succession onto one and the same region of a track, to produce in the longitudinal direction of the track very short and deep-lying recesses in order in this way to obtain very precise reliefs in the surface of a printing block blank.

In doing so, according to a refinement of the invention the optical device is constructed in such a way that it emits at least one beam, the control device being constructed in such a way that one beam in each case passes through one and the same track and on each passage of the track a new data file can be read out. If, for example, only one beam is present and three data files are to be worked through in order to obtain the depth levels in the surface of the printing block blank the beam would have to pass through any track in question three times.

It is also possible, however, to construct the optical device in such a way that it emits a plurality of beams which are each controlled by only one separate data file. In this case all beams would have to traverse one and the same track one after the other.

For this purpose the beams may be arranged alongside one another in a direction running transverse to the longitudinal direction of the track so that as a result of appropriate displacement in the transverse direction the beams can be brought into alignment with the track one after the other.

Alternatively, however, the beams may be arranged beside one another in the longitudinal direction of the track. In this case the beams are actuated by the data files with a time delay which corresponds to the spacing of the beams in the longitudinal direction of the track.

The beams used may be focused beams, focused laser beams for instance.

In principle the printing block blank can be a plate-shaped blank or a cylindrical printing block blank. It is of elastic construction at least on its surface and is preferably composed of polymeric material or contains at least one such. However, it may also be composed of silicone, rubber or another material, metal for instance.

For machining the printing block blank when constructed in the form of a plate the latter can be machined, for example, in the flat state when beams are guided along tracks and kept at a distance parallel to it. The beam sources and printing block blank could then be displaced relative to one another in parallel planes.

According to an advantageous development of the invention the printing block blank is constructed as a cylinder mounted to rotate about its longitudinal axis which carries on its surface an elastic material, for example polymeric material. This can be of plate-like construction and be laid around its surface. If it is fastened in the form of a plate on the cylinder surface the plate can also be removed from the latter again after machining in order to be used as a flat printing plate. However, the elastic or polymeric material may also remain fixed on the surface of the cylindrical support after it has been drawn onto the latter or applied in a different form, for instance by an immersion, knife-coating or spraying process and the like. In this case the entire cylinder is later used as a printing cylinder.

When machining or irradiating the printing cylinder to produce the surface relief the latter can be turned while at the same time a carriage carrying at least parts of the optical device and arranged displaceably in the direction of the longitudinal axis of the cylinder is moved. Items present on this carriage may be, for instance, tilted mirrors for diverting laser beams or laser beam sources may be mounted directly on it. It is also possible when turning the cylinder about its longitudinal axis to displace the latter simultaneously also in the direction of its longitudinal axis so that the surface of the printing block blank can be machined by an optical device in a fixed position. This variant would a advantageous if the optical device itself is composed of a large number of beam sources for producing a large number of beams and hence maladjustment due to vibrations is relatively great.

It has already been mentioned that for control of intensity or control of power, that is for switching the beams on and off, modulators are provided which are actuable via the data files. In doing so these can preferably be acousto-optical modulators which are actuable at high speed.

At the same time a particular one of the modulators is connected to at least one analogue switch through which a control voltage corresponding to the pattern information can be fed to the modulator, wherein the analogue switch can be switched by the data file. By this means very precise digital control of the machining beam or laser beam is possible.

Thus, for example, according to a refinement of the invention a modulator can be connected to the outputs of a plurality of analogue switches which are each switchable by one of the plurality of data files (pattern information) needed for engraving along a track, wherein the analogue switches each switch different control voltages. Depending on the data file and hence the selected analogue switch, a different control voltage corresponding to the pattern information arrives in this way at the modulator so that depending on the selected control voltage the latter emits a beam having greater or lesser intensity or power.

According to another refinement of the invention, however, a plurality of modulators may also be present to each of which an analogue switch is assigned which are each switchable by one of the plurality of data files needed for engraving along a track, wherein the analogue switches each switch different control voltages.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and of the scope of the invention will become apparent to those skilled in the art form this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

The principle of operation underlying the invention is described in more detail below with reference to FIG. 1. In FIG. 1, the reference number 1 identifies a printing block blank produced from polymer material. To produce a flexographic printing block, for example, a relief is engraved in a surface 2 of the printing block blank 1 with the aid of e.g. three focused laser beams 3, 4 and 5 by burning away regions of polymer material on the printing block blank 1. More or fewer than three laser beams could be used.

Figure 1:
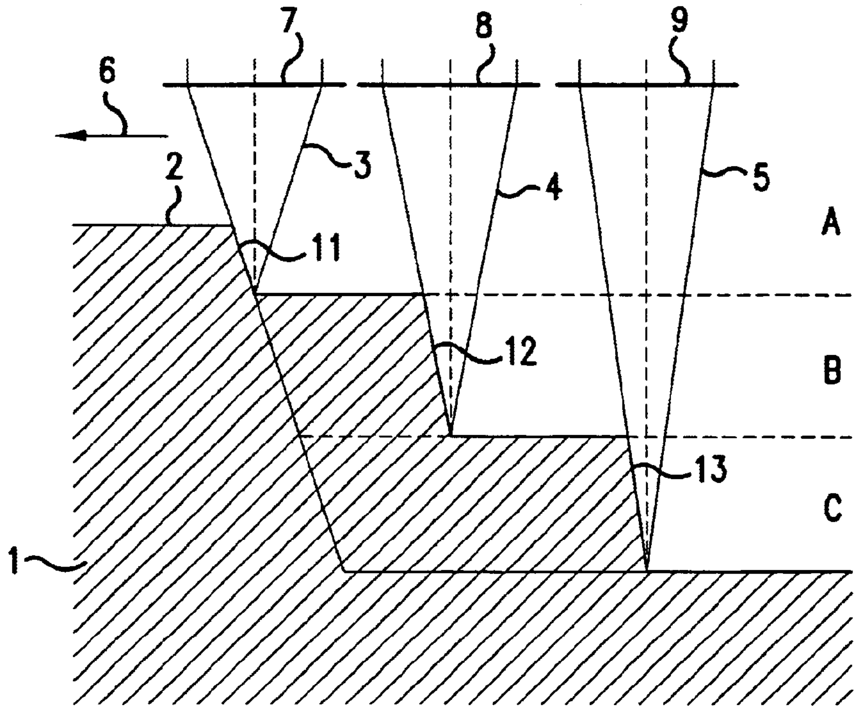
FIG. 1 is a cross section view illustrating the machining of a printing block blank, producing a relief in its surface.

To burn away the regions, the laser beams 3, 4 and 5 are moved in succession along a track running on the surface 2 in the direction of the arrow 6. The laser beam 3 is the leading laser beam and acts on the surface 2 of the printing block blank 1 first. It is followed along the same track with a time delay by the laser beam 4 which itself is followed along the same track again with a time delay by laser beam 5.

Depending on the depth of a recess to be incised into the surface 2 of the printing block blank 1 for the purpose of forming the relief, either only laser beam 3, laser beams 3 and 4 or all the laser beams 3, 4 and 5 are used.

Should the recess be relatively flat, only laser beam 3 is switched on which burns away only a section A below the surface 2 of the printing block blank 1. Laser beams 4 and 5 are then not switched on.

If on the contrary deeper recesses are desired the laser beams 4 and 5 are also used. In this case, the upper section A of the printing block blank 1 is again burned away, first of all with the aid of the laser beam 3, while a short time later the sect on B located under the base of section A is burned away with the aid of the laser beam 4. For a still deeper recess, after use of laser beam 4 the section C located under the base of section B is burned away with the aid of the laser beam 5, etc. Thus, by means of the laser beams 3, 4 and 5, relief regions in which relatively deep recesses are to be produced are irradiated several times one after the other in order, in successive steps, to burn away or to excavate further the base of the previously obtained recess.

The advantage of this principle is that due to the repeated removal of the base of one and the same region using only one or a plurality of laser beams the beam power can be kept relatively small which has the consequence that optical switching elements may be used for switching the laser beams on and off. Optical switching elements which have relatively fast switching characteristics, but must not be loaded with excessively high power. In this way, fine and very deep structures can be produced at the same time, which results in a considerable improvement in quality in the production of printing blocks (printing plates, printing rollers, etc). Examples of switching elements of the said type which could be used are acousto-optical modulators, deflectors or beam deflectors such as mirrors, etc.

The printing block blank in FIG. 1 may be, for example, a plate-shaped blank which is machined in the flat state or a cylindrical printing block blank which is located by way of example on the surface of a rotatably mounted cylinder and can be removed again from the latter. However, the cylinder itself could also be referred to as a printing block blank if it were coated on its surface with a polymer material for example.

According to a refinement of the invention the laser beams 3, 4 and 5 could have different power levels. The leading laser beam 3, for example, could have a lower power than the two following laser beams 4 and 5 so that with laser beam 3, first of all, the edges 11 of the relief can be better defined at relatively low power. Lower-lying regions formed at edges 12 and 13 of recesses B and C can then be burned away using the more powerful laser beams 4 and 5. Thus, for example, for laser beam 3 a 00 watt $CO_2$ laser beam could be used while laser beams 4 and 5 are 200 watt $CO_2$ laser beams.

The laser beams themselves are focused with the aid of lenses 7, 8 and 9, for which purpose these lenses may be located in the same plane for example but have different focal lengths depending on the depth of the region to be burned away by the laser beams. In FIG. 1 the lens 7 has the shortest focal length and lens 9 the longest focal length. Of course lenses of the same focal length in different planes could also be used if desired. In less precise reliefs lenses having approximately the same focal length could also lie at the same distance from the printing block blank 1. It would also be possible to use different beam diameters for the individual laser beams 3, 4 and 5, if desired.

Figure 2:
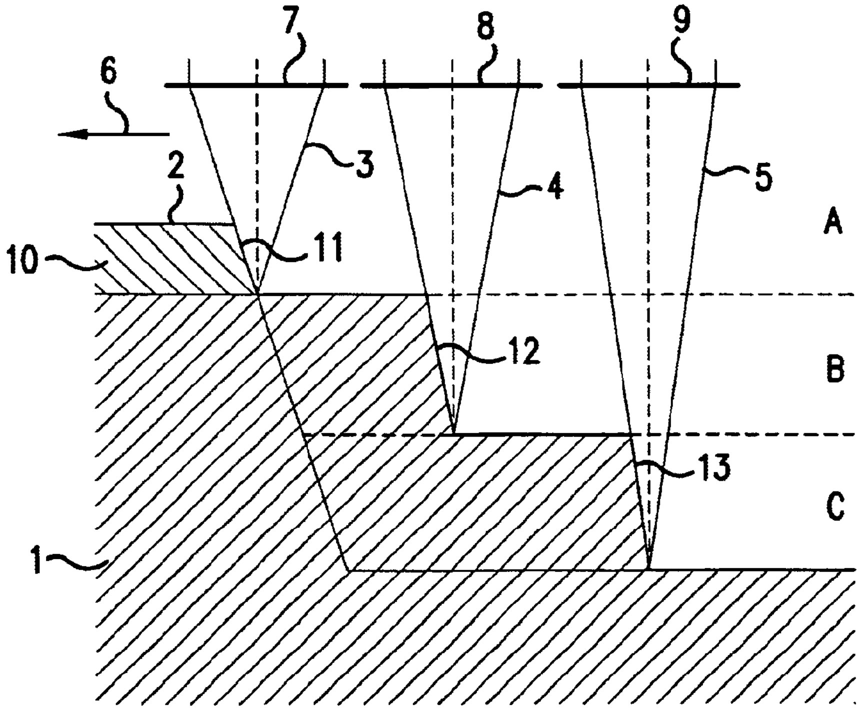
FIG. 2 is a cross sectional view illustrating the machining of a printing block blank having a spectrally adapted surface.

FIG. 2 shows a variant of the principle shown in FIG. 1. Here, an upper region 10 of the printing block blank 1 and the laser beam 3 for working on this upper region 10 are spectrally matched to one another. For this purpose, the surface of the printing block blank 1 is coated in the upper region 10 with corresponding material which is particularly sensitive to the wavelength of the laser beam 3. In this case, the laser beam 3 can be produced eg by a YAG laser, whose wavelength is 1,060 $\mu$m. The beam itself can have a power ranging from 50 to 100 watts. By means of such a laser, a beam width at the focus of approximately 10 $\mu$m is obtained so that distinctly fine structures can be produced in the surface region of the printing block blank 1. For this purpose, however, the material in the region 10 must be selected so that it can be readily burned away by the laser beam 3. The remaining laser beams 4 and 5 may again be generated by $CO_2$ lasers of 200 watts each so that lower level regions at a distance from the edges 11 of the relief can be burned away. Here such high precision is not required for the edges 12 and 13 so that beam widths in the focal region of 30 to 35 $\mu$m are acceptable.

In FIGS. 1 and 2, it may be seen how the relief structures are shaped like a pedestal. For this purpose, the laser beams 3, 4 and 5 in the direction of the track 6 are switched off at different points in the direction of the track 6. This then yields a stepped pedestal shape, wherein the inclination of the edges 11, 12, 13 corresponds approximately to the course of the focused laser radiation. The edges or flanks of the pedestal are identified in FIGS. 1 and 2 by 12 and 13.

Figure 3:
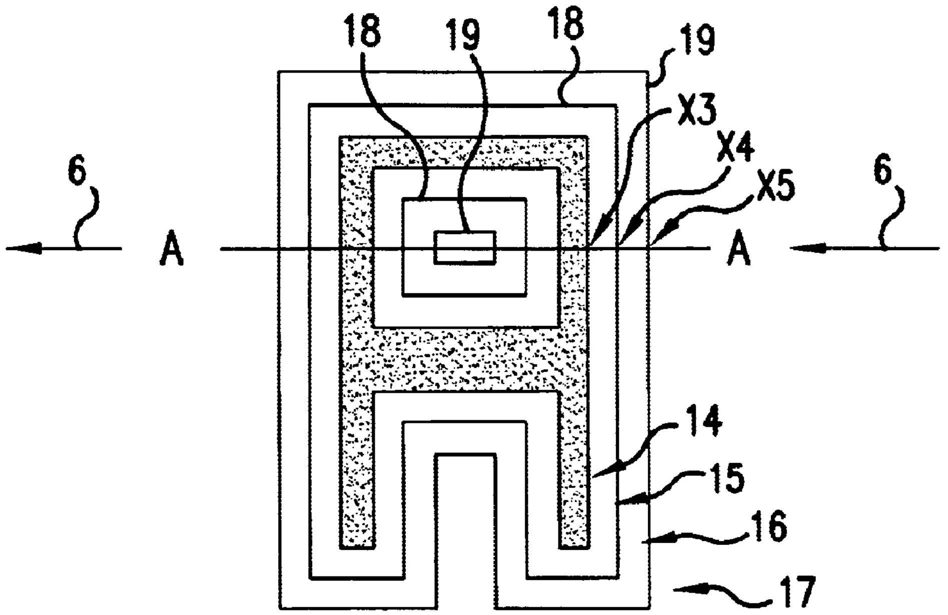
FIG. 3 is a plan view of a basic relief pattern with borders to identify relief regions, wherein parts of the basic relief pattern and the relief regions are at different depths by comparison with the basic pattern.

FIG. 3 shows a basic relief pattern in the form of a uniformly blackened region. This basic relief pattern 14 is the area to be printed and must be surrounded at its perimeter by lower-lying regions 15, 16 and 17. The material of the printing block blank 1 must, therefore, be burned away in the regions 15, 16 and 17. The resultant structure may be seen in FIG. 4. In this case, it is cross-section along the line A—A in FIG. 3.

The basic relief pattern 14, shown in FIG. 3, is used for switching the laser beams on and off. The basic relief pattern can be represented first of all on the screen of a computer and be temporarily stored in an electronic memory. Tracks are then laid down on which the laser beams are guided when the relief is engraved. It may be assumed that the line A—A in FIG. 3 is such a track. The basic relief pattern 14 can be provided in front or in the rear with borders 18, 19, that is to say on the inside and on the outside in order to define the regions 15, 16, 17 in which the material of the printing block blank 1 is to be burned away. At the points of intersection of the track A—A in FIG. 3 with the basic relief pattern or the borders 18, 19 there are then turn-on and turn-off points for the laser beams which, sorted according to the regions, are combined to form data files.

Figure 5:
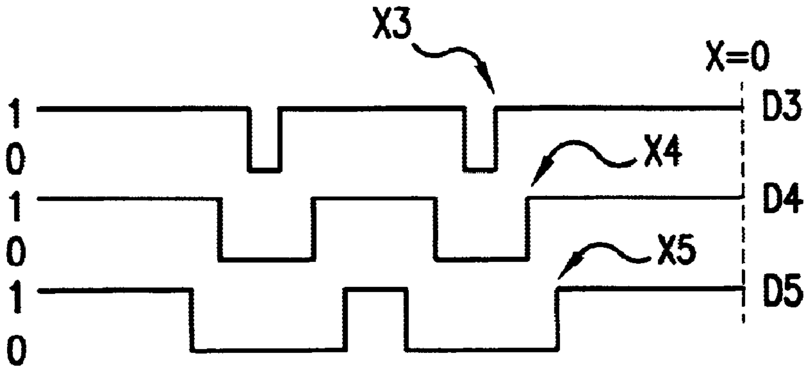
FIG. 5 illustrates three data files used to generate the basic relief pattern shown in FIG. 4.

If, for example, one moves along the line A—A in FIG. 3 in the direction of the arrow or track 6, to be more precise with the laser beams 3, 4 and 5 in FIG. 1, the first point of intersection of the track A—A with the basic relief pattern 14 gives rise to a turn-off point X3 for the laser beam 3 which is shown in FIG. 5. The point of intersection of the border 18 with the track A—A then yields a turn-off point X4 for laser beam 4 while the point of intersection of the border 19 with the track A—A produces a turn-off point X5 for laser beam 5. The points X4 and X5 are also sketched in FIG. 5. On moving further along the track A—A in FIG. 3, in the direction of the arrow 6 turn-on points again arise for the laser beams 3, 4 and 5, and again turn-off points, etc so that finally the three data files D3, D4 and D5 shown in FIG. 5 for switching the laser beams 3, 4 and 5 off and on are obtained.

The data files D3, 4 and D5 each possess values of “1” and “0” and serve to actuate acousto-optical modulators which for their part are used for switching the laser beams 3, 4 and 5. The start of a track in FIG. 5 is say at X=0 so that in the first pass of the track using laser beam 3 the regions 17, 16 and 15 over section A are burned away until laser beam 3 is switched off at X3. In the second pass of the track laser beam 4 is switched on at X=0 and switched off at X4 so that by means of the second laser beam 4 section B is burned over the regions 17 and 16. In the third pass of the track laser beam 5 is switched on at X=0 and switched off at X5 so that now over section C only region 17 is burned off. Thus, viewed from the location X=0 laser beam 3 is switched off latest and laser beam 5 earliest. After passing through the right-hand branch of the basic relief pattern in FIG. 3 laser beams 3, 4 and 5 are then switched on again in that sequence, etc.

The turn-on and turn-off points or data files may be generated automatically after producing the borders 18 and 19 and determining the track A—A and the track direction with the aid of suitable compute programs.

Figure 6:
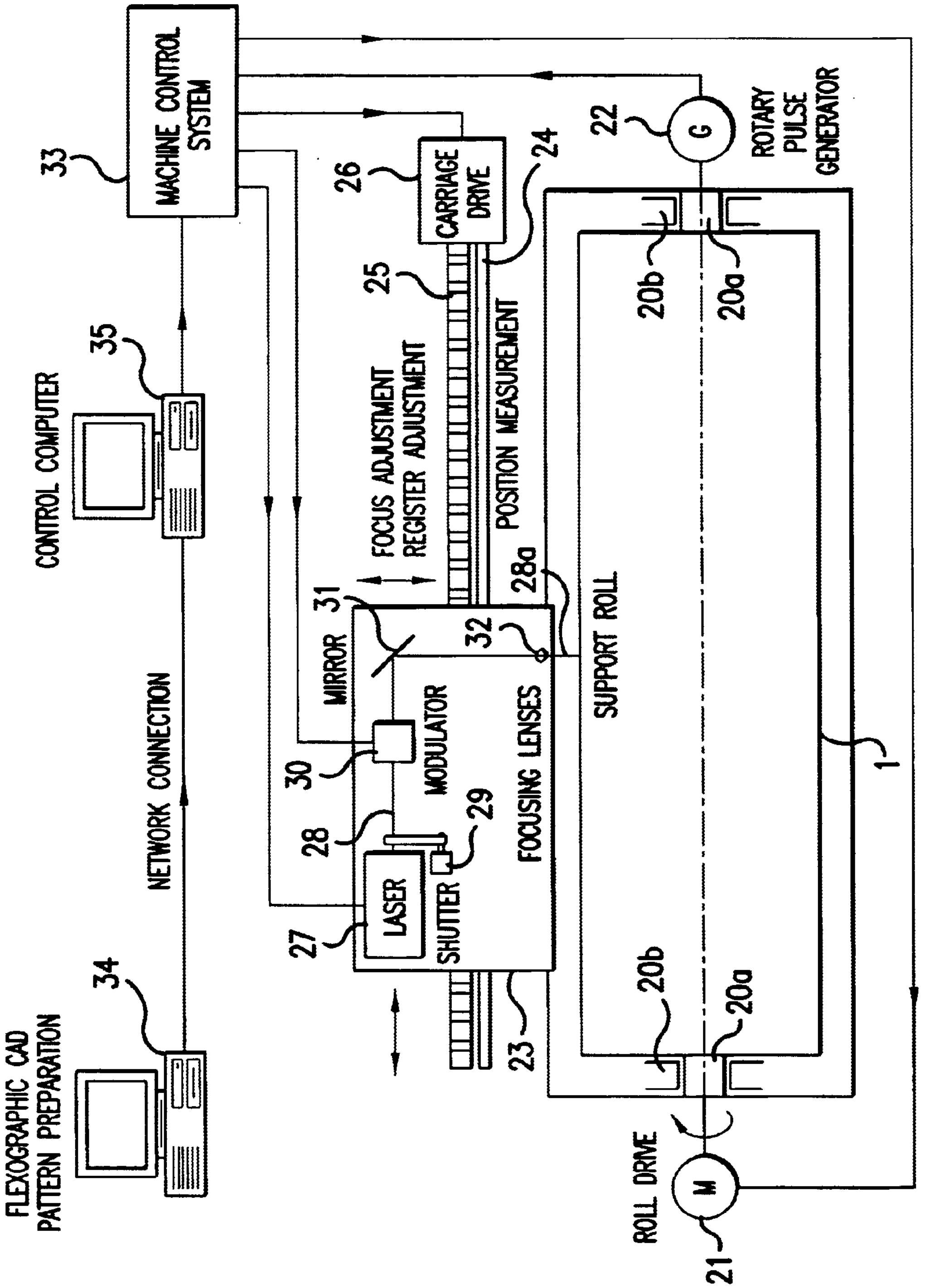
FIG. 6 illustrates a device according to a first embodiment of the invention for producing a printing block.

FIG. 6 shows the structure of a device according to the invention for producing a printing block, a flexographic printing block for instance.

The device includes a laser engraver with a machine bed 20. Mounted rotatably on the machine bed 20 is the printing block blank 1 to be engraved constructed in this case in the form of a hollow cylinder. For this purpose, the printing block blank 1 possesses a central shaft 20*a* which is accommodated by bearings 20*b* provided on the machine bed 20. The printing block blank 1 can be turned about its central axis by a motor 21. An encoder 22 or rotary pulse generator serves to produce pulses which correspond to the rotary position at the time of the printing block blank 1. A carriage 23 is moved on guides 24 parallel to the axis of the printing block blank 1. A screw spindle 25 serves to drive this carriage 23 along the guides 24, wherein the screw spindle 25 is turned by, a drive 26 in one or other direction in order to carry the carriage 23 along accordingly.

Mounted on the carriage 23 is a laser 27 which emits a laser beam 28. The laser beam 28 is blocked off by means of a shutter 29 when it is not needed. The laser beam 28 passes through a modulator 30 for switching it on and off and is deflected, by eg 90°, by a deflector mirror 31 and focused by a lens system 32 onto the surface of the cylindrical printing block blank 1. With the aid of the focused laser beam 28 the upper regions of the printing block blank 1 are burned off in part in order to engrave a relief into the surface of the printing block blank 1. For this purpose the cylindrical printing block blank carries on its surface a polymer coating so that after introducing a relief a flexographic printing block is obtained.

For operational control of the unit, there is a machine control system 33 which is connected via control leads to the laser 27, the modulator 30, the rotary drive 26, the motor 21 and the rotary pulse generator 22.

The device in FIG. 6 further includes a CAD system 34 which is connected to a control computer 35 which serves in turn to actuate the machine control system 33.

With the aid of the CAD system 34, a designer can draft a pattern on the associated monitor screen, for instance the basic relief pattern 14 shown in FIG. 3. Using appropriate commands the designer can then define on the CAD system borders 18 and 19 relative to the basic relief pattern 14, which determine regions in which the surface of the printing block blank 1 is to be removed outside the basic relief pattern.

The designer can also determine the track A—A in FIG. 3 along which the printing block blank 1 is later to be engraved. After this, the CAD system 34 computes the pattern information or data files shown in FIG. 5, the number of data files match the number of regions which are to be removed.

As already stated, this can be done using only a single or a plurality of successively used laser beams. The pattern information or data files D3 to D5 are then transmitted by the CAD system 34 to the control computer 35, where they are stored in order finally to be fed in the event of machining to the machine control system. The latter ensures the rotation of the printing block blank 1 about its central axis, the corresponding displacement of the carriage 23 in order to guide the laser beam 28 along the predetermined track on the surface of the printing block blank 1, and the switching of the laser beam 28 on and off in line with the data files D3 to D5 using the modulator 30 which here is constructed as an acouto-optical modulator.

Figure 7:
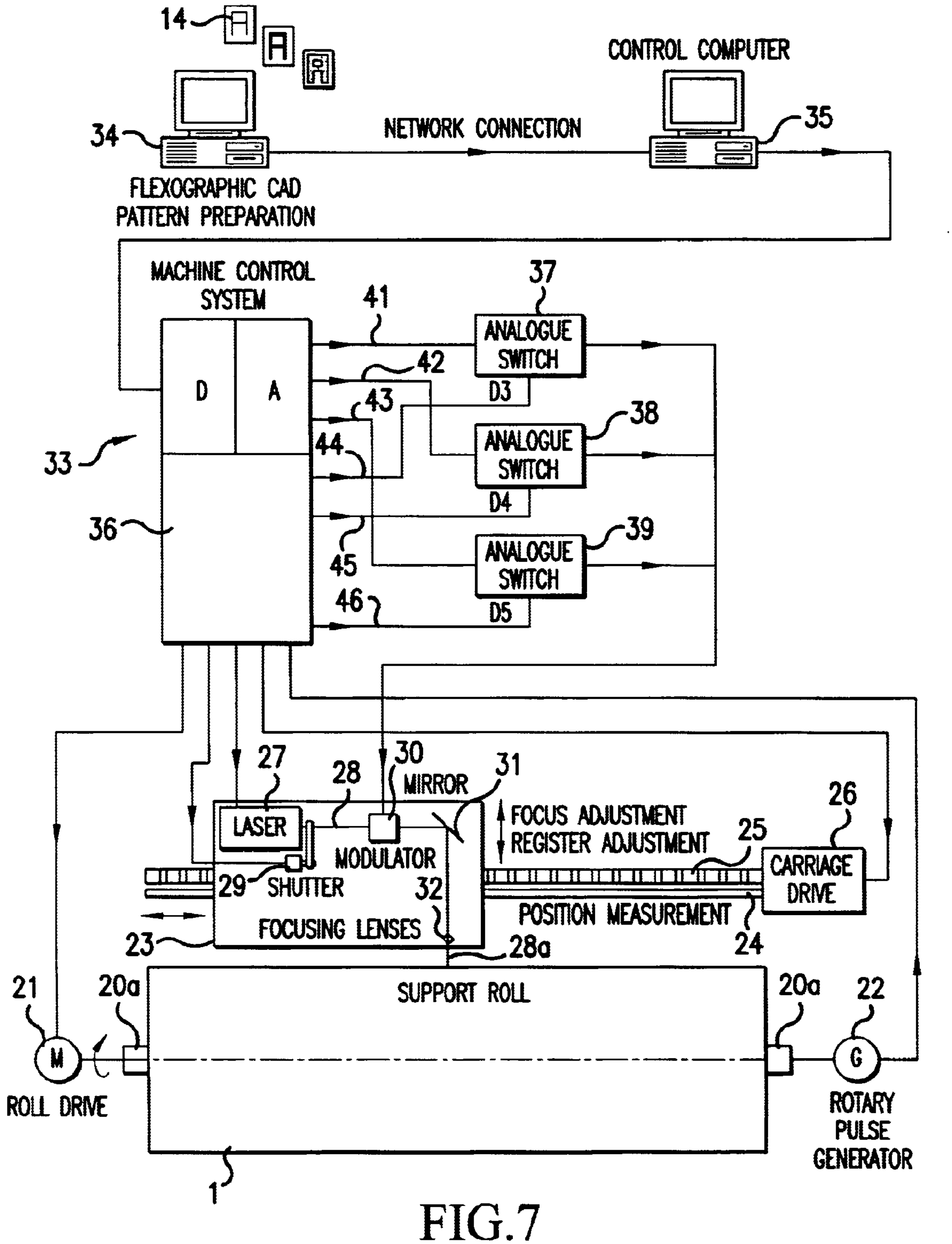
FIG. 7 illustrates a more detailed structure of the device shown in FIG. 6.

The internal structure of the machine control system is presented in more detail in FIG. 7. Elements equivalent to those in FIG. 6 are given the same reference numbers and are not described again.

The machine control system 33 contains a central control unit 36 together with a plurality of analogue switches, in this case three analogue switches 37, 38 and 39. On the output side each of the analogue switches 37 to 39 is connected to the control input of the modulator 30. In contrast, on the input side each analogue switch 37 to 39 receives a different control voltage via the leads 41, 42 and 43 from the central control unit 36. Thus, depending on start-up of one of the analogue switches 37 to 39 a control voltage of different magnitude arrives at the modulator 30 so that in line with the selection of one of the analogue switches 37 to 39 the intensity or power of the laser beam 28 can be controlled by the modulator 30. The selection or actuation of each of the analogue switches 37 to 39 ensues via control leads 44, 45 and 46 through which the central control unit 36 sends in each case one of the data files D3, D4 and D5 to one of the analogue switches 37, 38 and 39.

Figure 4:
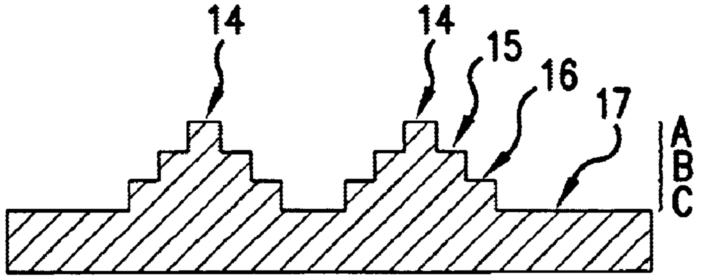
FIG. 4 is a cross sectional view along the line A—A of FIG. 3 illustrating a finished relief in the surface of the printing block blank.

In what follows, it may be assumed that the pattern shown in FIG. 4 is to be engraved along a perimeter line of the printing block blank 1, using in fact only the single laser 27.

In this case, three revolutions of the printing block blank 1 are necessary or three passes over the track. In the first pass of the carriage 23 over the track, the surface region over section A in FIG. 4 is to be engraved using relatively low radiation intensity. For this purpose, the data file D3 arrives at the control input of the analogue switch 37 which then in keeping with the data file D3 connects a relatively low voltage and transmits this switched low voltage to the control input of the modulator 30. On the next pass of the carriage 23 over the track the data file D4 arrives at the control input of the analogue switch 38 for the erosion of the region B in FIG. 4. The analogue switch 3B switches on a higher voltage in agreement with the data file D4 and transmits this higher voltage to the control input of the modulator 30 so that now the laser beam 28 reaches the surface of the printing block blank 1 with higher intensity. The third pass of the carriage 23 over the track ensues through the use of the data file D5 at the control input of the third analogue switch 39 which can likewise actuate a higher voltage for controlling the modulator 30.

The above-mentioned operation may be repeated for a next parallel track, etc. The above system can of course be provided in multiples in order to shorten the engraving time. In each pass of the track the carriage 23 is then stationary. Engraving along helical paths is also possible, with the further possibility of working in interlace mode in order to avoid block boundaries.

Figure 8:
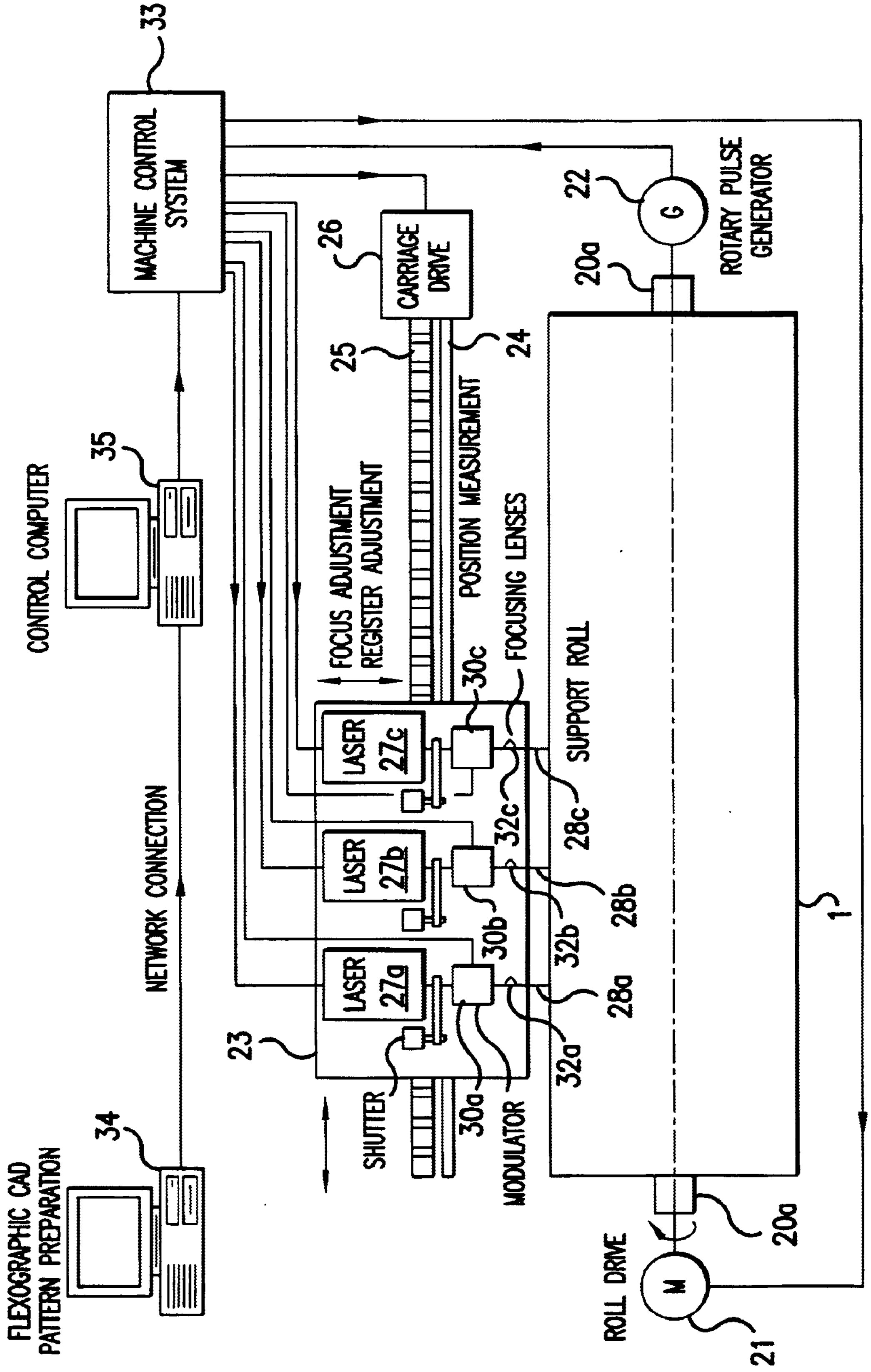
FIG. 8 illustrates a device according to a second embodiment of the invention for producing a printing block.

FIG. 8 shows a second embodiment of a laser machining system according to the invention. Elements equivalent to those in FIGS. 6 and 7 are once more provided with the same reference numbers and are not described again.

As a departure from the embodiment exemplified in FIGS. 6 and 7, the carriage 23 here has three lasers 27*a* to 27*c* located alongside one another. Assigned to each of these lasers is a dedicated shutter, dedicated modulator and a dedicated lens system. Assigned to each of the modulators 30*a* to 30*c*, which again are constructed as acousto-optical modulators, is a dedicated analogue switch in the machine control system 33, which each correspond to one of the analogue switches 37 to 39 in FIG. 7. Each lasers 27*a* to 27*c* is supplied with the same input voltage (if one analogue switch is coupled to its modulator) or different input voltages (if plural analogue switches are coupled to its modulator) so that they can provide focused laser radiation of the same or differing power, respectively.

When turning the cylindrical printing block blank 1 about its longitudinal axis, the carriage 23 is simultaneously displaced from right to left in FIG. 8. The focused laser beams 28*a* to 28*c* run on threaded linear tracks over the surface of the printing block blank 1. In doing so, the focused laser beam 28*a* precedes and first of all engraves the surface regions corresponding to the regions A in FIG. 4. Next, the focused laser beam 28*b* runs along the same linear threaded track and in doing so engraves regions corresponding to the regions B in FIG. 4. After that the same track is traversed by the focused laser beam 28*c* in order to engrave the regions along the track corresponding to the regions C in FIG. 4. In this case, the power of the focused laser beams can be controlled to match the exemplified embodiment shown in FIG. 7 by applying, for instance, voltages of different magnitude to the control input of the acousto-optical modulators and actuating them in line with the corresponding data files. Here also block, operation would be possible in which only cylindrical tracks are scanned.

Figure 9:
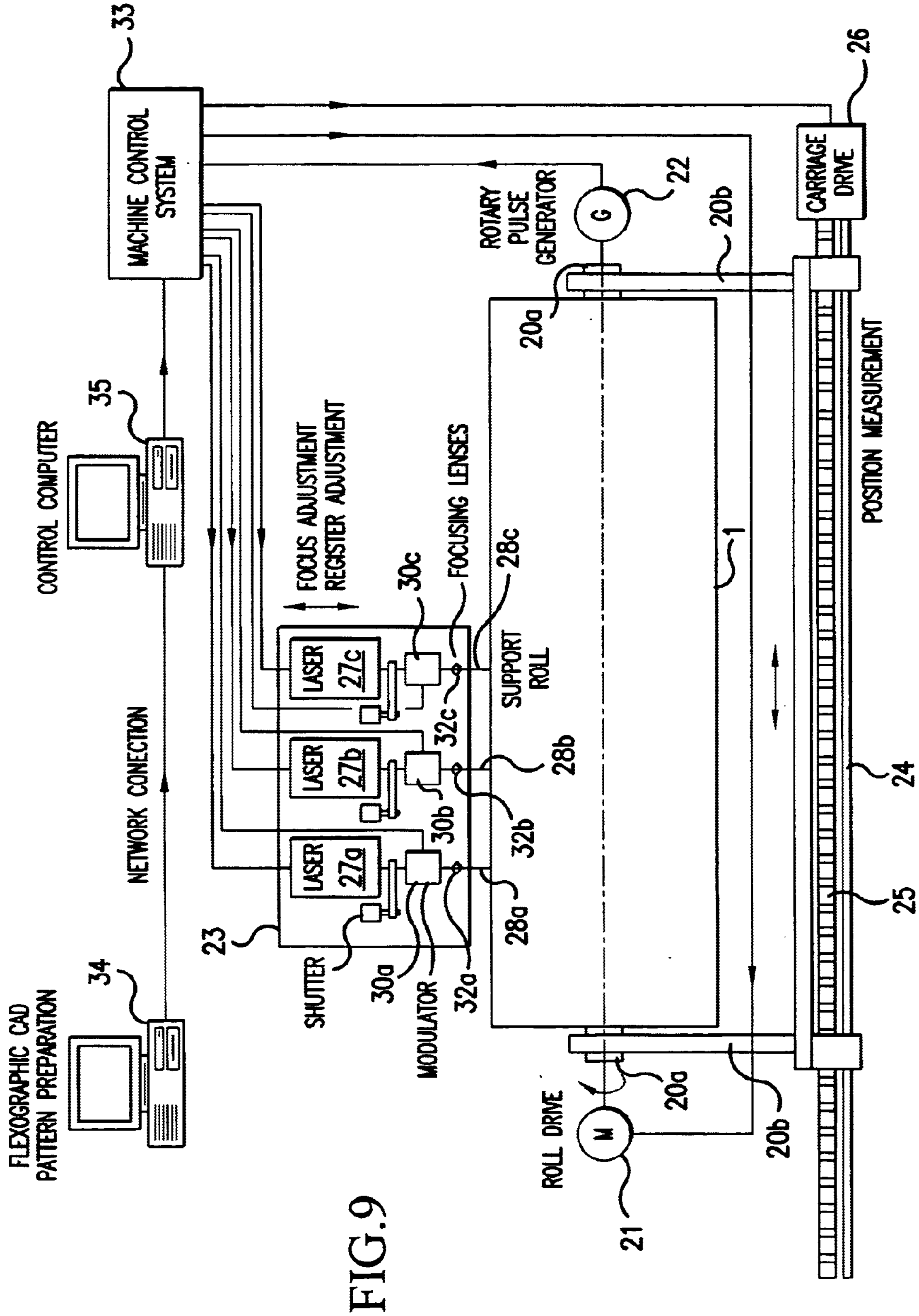
FIG. 9 illustrates a device according to a third embodiment of the invention for producing a printing block.

A third exemplified embodiment of the device according to the invention is illustrated in FIG. 9. Once again, identical elements to those in FIGS. 6 to 8 are provided with the same reference numbers and are not described again. Here, in contrast with the embodiment exemplified in FIG. 8, the carriage 23 is arranged in a fixed position, that is it is no longer displaceable in the longitudinal direction of the cylindrically shaped printing block blank. On the contrary, the printing block blank 1 is now mounted displaceably in the longitudinal direction of the cylinder for which purpose it is now arranged on the guides 24 and is driven, for example, with the aid of the screw spindle 25 which itself is turned by the rotary drive 26 in one or other direction. This arrangement is advantageous when very many lasers are used for the simultaneous machining of the printing block blank 1 since in this case this large number of lasers cannot then be transported with sufficient stability and lack of vibration on a mobile carriage.

Figure 10:
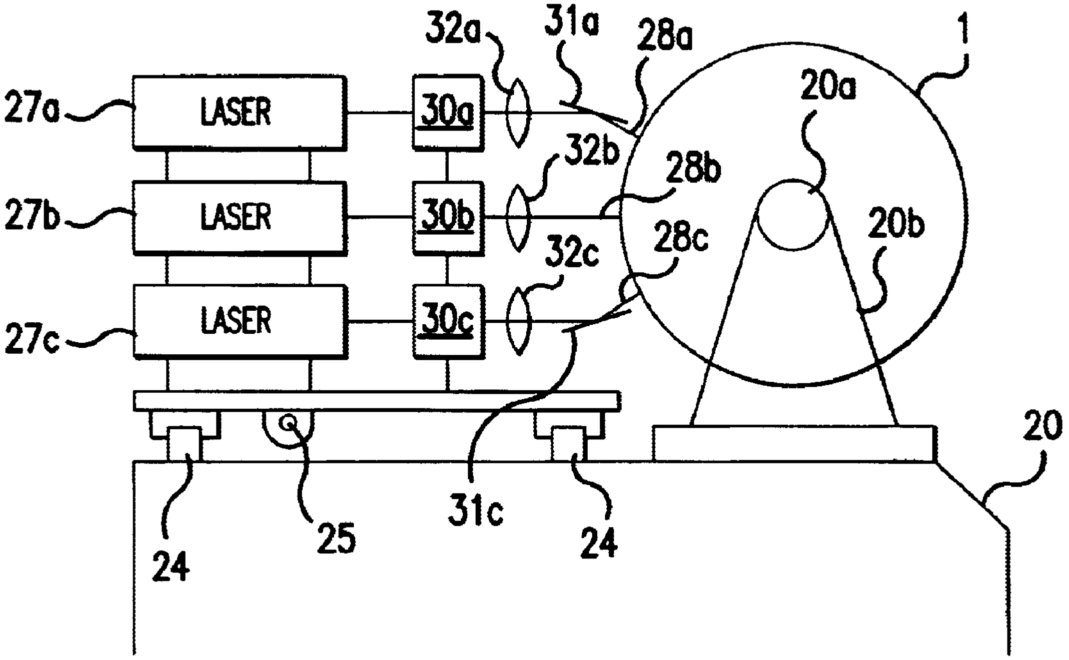
FIG. 10 illustrates a device according to a fourth embodiment of the invention for producing a printing block.

A fourth exemplified embodiment of the system according to the invention is shown in FIG. 10. In this case, three focused laser beams 28*a*, 28, 28*c* come simultaneously onto a track running in the circumferential direction of the cylindrical printing block blank 1. In doing so, the three focused laser beams 28*a* to 28*c* are offset relative to one another in this circumferential direction. They are generated with the aid of three lasers 27*a*, 27*b* and 27*c* which are arranged, by way of example, on top of one another on the carriage 23 and can be actuated or modulated by three acousto-optical modulators 30*a* to 30*c*. Focusing ensues by means of three lenses 32*a* to 32*c*, deflecting mirrors 31*a* and 31*c* being provided for the uppermost and lowermost beam. Here too, the three laser beams could be controlled by means of the acousto-optical modulators 30*a* to 30*c* in accordance with the scheme shown in FIG. 5.

The invention being thus described, it will be obvious that the same may be varied in many ways. Such variations are not to be regarded as a departure from the spirit and scope for the invention, and all such modifications as would be obvious to one skilled in the art are intended to be included within the scope of the following claims.

What is claimed is:

1. A method for producing a printing block in which a relief is introduced into a surface of a printing block blank comprising the steps of:

removing material of the printing block blank along tracks by radiation; and producing along one track, relief regions located at different depths by frequent exposure to radiation, wherein the exposure to radiation ensues with multiple beams, which are selectively controlled and guided along the same track.

2. The method according to claim 1, wherein the multiple beams are arranged alongside one another in a direction which runs transverse to a longitudinal direction of the track.

3. The method according to claim 1, wherein the multiple beams are arranged alongside one another in a direction which runs in a longitudinal direction of the track.

4. The method according to claim 1, wherein relief regions at different depths are removed by beams of different power.

5. The method according to claim 1, wherein relief regions at different depths are removed by beams of differing wavelength.

6. The method according to claim 4, wherein relief regions located near the surface of the printing block blank are removed by beams whose power is less and/or whose wavelength is shorter than that of those beams serving to remove lower-lying relief regions.

7. The method according to claim 1, wherein areas of the material of the printing block blank bounding the surface to have the relief are removed first.

8. The method according to claim 1, wherein areas of the material of the printing block blank bounding the surface to have the relief are adapted in their spectral sensitivity to a wavelength of the radiation.

9. The method according to claim 1, wherein the exposure of the printing block blank to radiation is effected using laser radiation.

10. The method according to claim 1, wherein the beams are moved relative to the printing block blank.

11. The method according to claim 1, wherein the printing block blank is moved relative to the beams which are fixed in a position.

12. The method according to claim 1, wherein the printing block blank includes a polymer material which is irradiated with the radiation.

13. The method according to claim 12, wherein the printing block blank is substantially flat and composed of the polymer material, and wherein the printing block blank is laid on the surface of a rotatably mountable cylinder.

14. The method according to claim 12, wherein the printing block blank is formed by pulling or applying the polymer material onto the surface of a rotatably mountable cylinder.

15. The method according to claim 1, wherein the exposure to radiation of the printing block blank along the track ensues as a function of data files, each of which is assigned to one of the relief regions located at different depths.

16. The method according to claim 15, wherein the data files are generated as follows:

constructing an electronic storage of a two-dimensional basic relief pattern;

constructing of one or more borders located at different distances from the basic relief pattern to identify relief regions, which with increasing distance from the basic relief pattern are intended to be at a greater depth;

drawing a track through the basic relief pattern;

searching for boundaries in the basic relief pattern and the relief regions on the basis of the borders on the track; and determining beam-on and beam-off switching commands on the basis of the discovered boundaries and sorting the beam-on and beam-off switching commands into respective data files.

17. The method according to claim 16, wherein the data files are used to modulate the beams.

18. The method according to claim 17, wherein the respective data files have assigned to them respective, different control voltages for modulating the beams.

19. A device for producing a printing block comprising:

a mount for holding a printing block blank;

an optical device for exposing radiation on a surface of the printing block blank along a track, said optical device including at least one beam to remove regions of the printing block blank; and a control device which uses a data file containing beam-on and beam-off control commands which control changes in the intensity of the at least one beam on its path along the track, wherein the control device is constructed in such a way that it provides a plurality of data files, each containing beam-on and beam-off commands, and each serving for a timed, machining of the printing block blank along the entire track, wherein the optical device is constructed in such a way that it has the ability to emit a plurality of beams which are each controllable by one separate data file.

20. The device according to claim 19, wherein the beams are arranged alongside one another in a direction running transverse to a longitudinal direction of the track.

21. The device according to claim 19, wherein the beams are arranged alongside one another in a direction running in a longitudinal direction of the track.

22. The device according to claim 19, wherein the beams are laser beams.

23. The device according to claim 19, wherein the mount is adapted to hold a printing block blank constructed as a cylinder mounted rotatably about its longitudinal axis which carries on its surface an elastic material.

24. The device according to claim 23, wherein a carriage is arranged displaceably in the direction of the longitudinal axis of the cylinder and carries at least parts of the optical device.

25. The device according to claim 23, wherein the mount is displaceable in the direction of its longitudinal axis and the optical device is in a fixed position.

26. The device according to claim 19, wherein modulators are provided which control an intensity of the beams and which are actuable, at least indirectly, via the data files.

27. The device according to claim 26, wherein each modulator is connected to at least one analogue switch through which a control voltage is suppliable to the modulator and wherein the analogue switch is switchable by the data file.

28. The device according to claim 27, wherein each modulator is connected to the outputs of a plurality of analogue switches, which are each switchable by one of the plurality of data files needed for engraving along a track, and wherein the analogue switches each switch different control voltages.

29. The device according to claim 26, wherein an analogue switch is assigned to each modulator, and wherein each analogue switch is switchable by one of the plurality of data files needed for engraving along a track, and wherein the analogue switches each switch different control voltages.

30. The device according to claim 26, wherein the modulators are acousto-optical modulators.

31. The device according to claim 26, wherein the modulators are deflectors or beam deflectors.

32. The device according to one of claim 19, wherein the beams are focused beams.

* * * * *